United States Patent [19]

Kitazawa et al.

[11] Patent Number: 5,231,442
[45] Date of Patent: Jul. 27, 1993

[54] CAMERA WITH ZOOM LENS OPERATION DISPLAY DEVICE

[75] Inventors: Toshiyuki Kitazawa; Kazuo Goto, both of Tokyo, Japan

[73] Assignee: Asahi Kogaku Kogyo Kabushiki kaisha, Tokyo, Japan

[21] Appl. No.: 655,152

[22] Filed: Feb. 14, 1991

[30] Foreign Application Priority Data

Feb. 14, 1990 [JP] Japan ................................ 2-033010
Feb. 14, 1990 [JP] Japan ................................ 2-033013

[51] Int. Cl.$^5$ .......................... G03B 3/00; G03B 17/18
[52] U.S. Cl. .................................. 354/400; 354/472; 354/199
[58] Field of Search .................. 354/400-409, 354/198, 199, 200, 201, 195.1, 195.13, 472

[56] References Cited

U.S. PATENT DOCUMENTS

| | | | |
|---|---|---|---|
| 4,313,657 | 2/1982 | Tokutomi et al. | 354/198 |
| 4,361,390 | 11/1982 | yamada | 354/198 |
| 4,855,782 | 8/1989 | Kobayashi et al. | 354/195.13 X |
| 4,942,417 | 7/1990 | Miyazawa et al. | 354/400 |
| 4,945,371 | 7/1990 | Hashimoto et al. | 354/195.13 X |
| 4,977,425 | 12/1990 | Yamanabe et al. | 354/409 X |
| 4,984,000 | 1/1991 | Watanabe et al. | 354/195.1 |
| 4,984,000 | 1/1991 | Watanabe et al. | 354/195.1 |
| 4,994,846 | 2/1991 | Kobayashi et al. | 354/418 |

FOREIGN PATENT DOCUMENTS

| | | |
|---|---|---|
| 0325229 | 7/1989 | European Pat. Off. |
| 63-195639 | 8/1988 | Japan |
| 1309034 | 12/1989 | Japan |
| 2220761 | 1/1990 | United Kingdom |
| 2221050 | 1/1990 | United Kingdom |
| 2229284 | 9/1990 | United Kingdom |
| 2235784 | 3/1991 | United Kingdom |
| 2236401 | 4/1991 | United Kingdom |

OTHER PUBLICATIONS

English Language abstracts of Japanese Patents JP-63-195639 and JP-1-309034.

Primary Examiner—Donald A. Griffin
Assistant Examiner—Jae N. Noh
Attorney, Agent, or Firm—Sandler Greenblum & Bernstein

[57] ABSTRACT

A camera has a zoom lens. The zoom lens has a variable focal length over a predetermined focal length range, the ends or limits of which correspond to the longest and the shortest focal lengths of the zoom lens, respectively. The camera includes a detector which detects when the focal length of the zoom lens is at one end of the focal length range, and a display which provides an indication for the user of the camera that the focal length of the zoom lens is at that one end. With a plurality of different zoom modes, the camera has a zoom mode selector which selects one of the zoom modes that is to be used, and the selected zoom mode is displayed. The camera further includes another detector which detects the direction of zooming operation of the zoom lens, and the detected direction is also displayed. Useful information relating to various zoom lens operations is provided by the display for the user of the camera.

29 Claims, 11 Drawing Sheets

DIRECTION OF ROTATION TOWARD TELE END

DIRECTION OF ROTATION TOWARD WIDE END

FLASHED ON AND OFF

CAMERA WITH ZOOM LENS OPERATION DISPLAY DEVICE

The present disclosure relates to subject matter contained in Japanese patent application No. 2-33010 (filed on Feb. 14, 1990) and Japanese patent application No. 2-33013 (filed on Feb. 14, 1990) which are expressly their entireties.

BACKGROUND OF THE INVENTION

1. Field of the Invention:

The present invention relates to a camera having a zoom lens, and more particularly to a zoom lens operation display device for such a camera.

2. Description of the Relevant Art:

Cameras with motor-driven zoom lenses have been developed and are now in wide use today. There has also been developed a camera with a motor-driven zoom lens which can operate in various modes, i.e., a manual zoom mode in which zooming movement of the zoom lens is manually achieved by the user, a motor-driven zoom mode in which the zoom lens is zoomed by a motor, and a control zoom mode such as a fixed-magnification zoom mode in which zooming movement of the zoom lens is automatically controlled so that the image of an object on a photographic film in the camera has a fixed size irrespective of the distance from the camera to the object.

Typically, a zoom lens has a variable focal length over a predetermined focal length range, which has ends or limits corresponding to the longest and the shortest focal length of the zoom lens.

The conventional camera of the above type is however unable to give indications of the ends of the focal length range of the zoom lens, i.e., a tele end at which the focal length of the zoom lens is longest, and a wide end at which the focal length of the zoom lens is shortest. Without such indications, the user of the camera may become anxious about the operation of the camera. For example, when the zoom lens reaches the tele or wide end during automatic zooming movement in the fixed-magnification zoom mode, the zoom lens is automatically stopped. Since the camera gives no indication or display of these conditions at this time, the user is highly likely to misunderstand the stoppage of the zoom lens as a failure.

In the motor-driven zoom mode, the user gets no tactile assurance when the zoom lens reaches the tele or wide end, and hence cannot easily recognize the tele or wide end as it is reached by the zoom lens. If the user were given indications as to the tele or wide end in the motor-driven zoom mode, the user would find it easier and more efficient to use the camera.

Conventional cameras with motor-driven zoom lenses do not indicate zoom lens operating conditions such as the direction in which the zoom lens is moved and the selected mode of operation of the zoom lens. When the fixed-magnification zoom mode is selected, the zoom lens is automatically driven. If the user forgets the fact that the camera is in the fixed-magnification zoom mode, then it will be possible for the camera to produce a picture which is not intended by the user. Therefore, the user should be careful enough not to forget the fixed-magnification zoom mode once it is selected.

In the motor-driven zoom mode, the zoom lens starts to move when the user pushes a zoom switch. When the object to be photographed is dark, however, the user may not easily visually recognize whether the image formed in the viewfinder is being enlarged or reduced in size, and hence may not easily determine the direction in which the zoom lens is moving, i.e., whether the zoom lens is moving toward the tele end or the wide end.

SUMMARY OF THE INVENTION

In view of the aforesaid drawbacks of the conventional cameras with zoom lenses, it is an object of the present invention to provide a camera with a zoom lens operation display device for displaying tele and wide ends as they are reached by a zoom lens during its zooming operation, in a display area in a viewfinder.

Another object of the present invention is to provide a camera with a zoom lens operation display device which can display the direction in which a zoom lens is moving or a mode in which the zoom lens is driven, in a display area in a viewfinder.

According to the present invention, there is provided a camera comprising a zoom lens, an automatic focusing mechanism for focusing the image of an object which is formed through the zoom lens on the film plane, display means for displaying a focused or defocused condition of the image in a predetermined display mode, and display control means for controlling the display means to display an end of the focal length range of the zoom lens in a display mode different from the predetermined display mode.

The display means therefore can display information as to an end, i.e., a tele end or a wide end, of the focal length range of the zoom lens.

The information is displayed in a display mode different from the display mode in which the focused or defocused condition is displayed in an automatic focusing mode. For example, when the tele or wide end of the focal length range is detected, the display means is intermittently activated at a period different from a period at which the display means is intermittently energized when the focused or defocused condition is detected. The different periods at which the display means is intermittently energized, i.e., flashed on and off, allow the user to recognize the displayed focused or defocused condition and also the displayed tele or wide end of the focal length range of the zoom lens.

The display means may also be controlled to display information as to the tele or wide end which is reached by the zoom lens, based on the direction in which the zoom lens is rotated until the tele or wide end is reached. For example, the display means may display a mark composed of an array of bars, and these bars may be successively energized or lighted in the direction corresponding to the direction in which the zoom lens is rotated, or the display means may display an arrowhead mark which is energized or lighted so as to point in the direction corresponding to the direction in which the zoom lens is rotated.

The display means may be operable only when the zoom lens is automatically controlled in response to a signal from the camera, i.e., when the camera is in a motor-driven zoom mode or a control zoom mode other than a manual zoom mode. According to such an alternative, the number of display modes is reduced, resulting in a reduction in the cost of the camera and an increase in the ease with which the camera is used, as compared with cameras that have all display modes with respect to operation of zoom lenses.

According to the present invention, there is also provided a camera comprising a zoom lens, an automatic focusing mechanism for focusing the image of an object which is formed through the zoom lens on the film plane, display means for displaying a focused or defocused condition of the image in a predetermined display mode, a self-timer mechanism for releasing a shutter with a preset delay, alarm means for producing a first alarm sound when the shutter is released using the self-timer mechanism or when the focused condition of the image is achieved, and display control means for controlling the display means to display an end of the focal length range of the zoom lens in a display mode different from the predetermined display mode, and for controlling the alarm means to produce a second alarm sound, different from said first alarm sound, when the end of the focal length range is reached. Therefore, the user of the camera can obtain a visual and audible confirmation as to the operated condition of the zoom lens.

Furthermore, the camera further comprises zoom mode selecting means for selecting one of a motor-driven zoom mode and a control zoom mode for moving the zoom lens, the display control means comprising means for controlling the display means to display a selected one of the motor-driven and control zoom modes in the viewfinder and a zoomed condition of the zoom lens.

The display means displays the selection of the motor-driven zoom mode and the direction of zooming movement of the zoom lens, i.e., the direction in which the zoom lens is driven, in the motor-driven zoom mode, and also displays the selection of the control zoom mode in the control zoom mode.

The display means may comprise an LED or an LCD. The display control means comprises means for controlling the display means to display the selected zoom mode and the direction in different display modes both when the motor-driven zoom mode are selected and when the control zoom mode are selected. The display means comprises means for displaying a plurality of bars having progressively varying lengths and which are successively or simultaneously energizable to display the zoom mode and the direction. The direction in which the bars are successively energized or lighted is indicative of the direction in which the zoom lens is driven, and the simultaneous energization or lighting of the bars is indicative of the control zoom mode.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
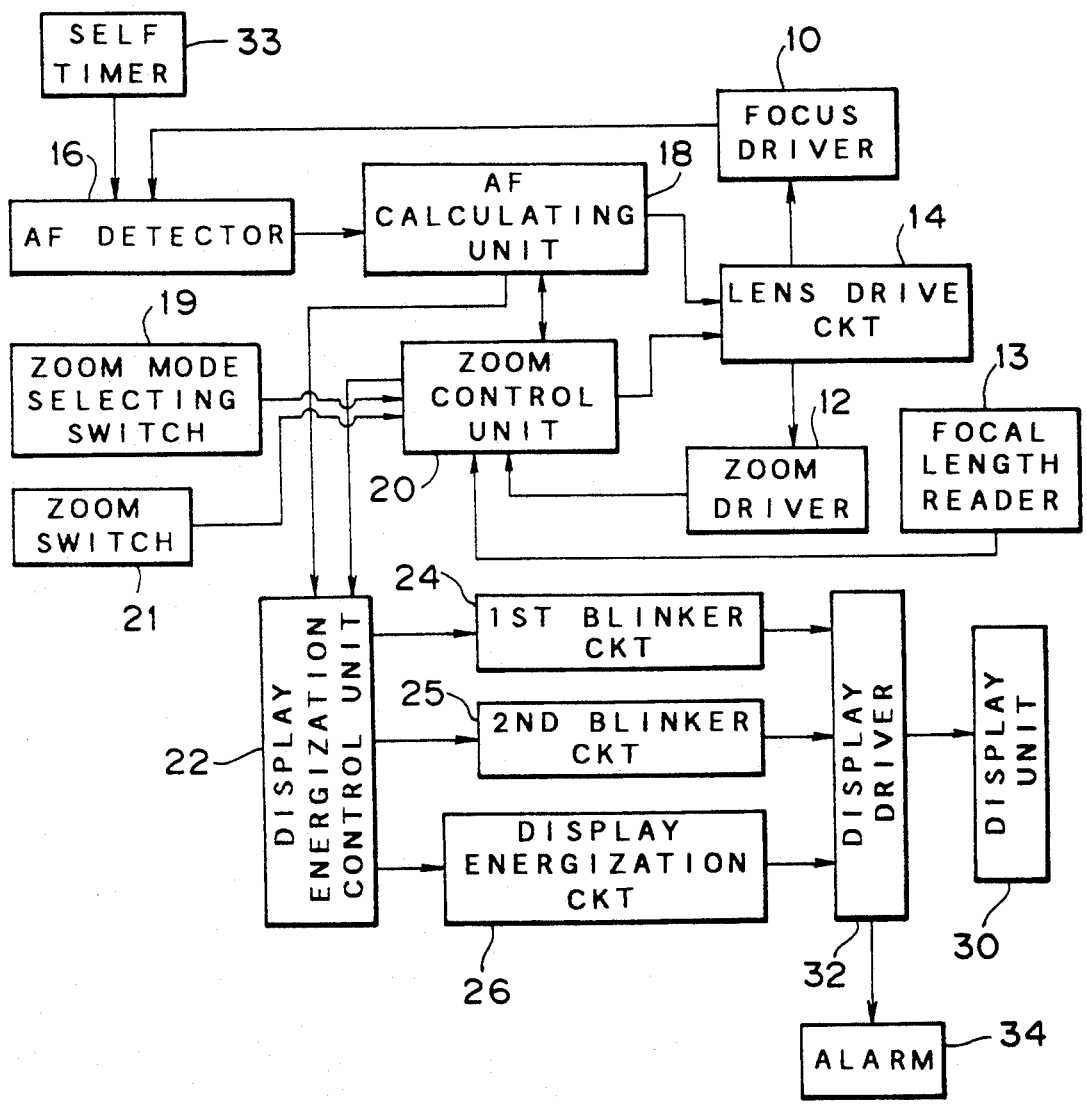
FIG. 1 is a block diagram of a zoom lens operation display device for a camera according to a first embodiment of the present invention.

FIG. 1 shows in block diagram a zoom lens operation display device for a camera according to a first embodiment of the present invention. In the illustrated embodiment, the camera is in the form of a single lens reflex camera with an automatic focusing mechanism.

The camera has a zoom lens L (FIG. 2) including a focusing lens (not shown). As shown in FIG. 1, the zoom lens operation display device includes a focus driver 10 for driving the focusing lens and a zoom driver 12 for driving the magnifying lens. The focus driver 10 and the zoom driver 12 are controlled by signals from a lens drive circuit 14.

The zoom lens L is slidably held by a lens holder (not shown). The zoom lens L and the lens holder are associated with a brush and a code plate (not shown). The code plate has an array of spaced electric contacts corresponding to respective focal lengths (e.g., 28 mm, 35 mm, 70 mm, ..., 105 mm) for the zoom lens L. If the brush is combined with the zoom lens L, then the code plate is combined with the lens holder, and vice versa.

The zoom lens operation display device shown in FIG. 1 also includes a focal length reader 13 which detects which of the electric contacts of the code plate is contacted by the brush, and transmits focal length information representative of the present focal length of the zoom lens L to a zoom control unit 20 (described below).

An AF detector 16 serves to detect a condition of the image of the object which is formed through the zoom lens L and to apply a detected signal to an AF calculating unit 18 for calculating a defocus amount and a defocus direction with respect to said zoom lens L by a phase-difference detecting method. The AF calculating unit 18 also calculates the distance from the camera to the object, based on the defocus amount, the defocus direction, the axial shift of the focusing lens from its original position (corresponding to the infinite) to the current position, and the focal length information described above, and according to suitable formula well known in the art. The defocus amount and the defocus direction are indicative of the distance and direction of the focusing lens from the present position in order to bring the focusing lens into a focused position which is predetermined depending on the distance between the camera and the object. The AF calculating unit 18 also determines whether the image of the object is focused on a position equal to the film plane position or not. In calculating the amount by which the image is defocused, the AF calculating unit 18 also refers to a focal length signal from the zoom control unit 20.

The calculated information relative to the defocused amount of the image is supplied from the AF calculating unit 18 to the lens drive circuit 14. Based on the supplied defocus information, the lens drive circuit 14 controls the focus driver 10 to move the focusing lens along its optical axis by the distance and in the direction, indicated by the defocused condition, until the image of the object is focused on said position.

After the focusing lens has been started to move on the basis of the defocused amount, the focus driver 10 applies a trigger signal to the AF detector 16, which again detects the condition of the image formed through the zoom lens L and applies the detected information to the AF calculating unit 18.

The AF calculating unit 18 calculates a defocus amount once more, and determines that the image is focused on said position when the calculated defocus amount falls within an certain allowable range.

If the AF detector 16 fails to detect a condition of the image and the AF calculating unit 18 cannot calculate a defocused amount, then the AF calculating unit 18 determines that the image of the object cannot be focused and hence the image is defocused.

Information as to whether the image is focused or defocused on said position obtained from the AF calculating unit 18 is transmitted to a display energization control unit 22 (described below).

A zoom mode selecting switch 19, when manually operated by the user, selects a desired one of a manual zoom mode, a motor-driven zoom mode, and a control zoom mode in the zoom control unit 20. When the user selects one of the modes with the zoom mode selecting swith 19, the zoom control unit 20 operates in the selected mode.

A zoom switch 21 is manually operated by the user to produce a signal representing a desired direction of zooming movement of the zoom lens L. The zoom switch 21 can be activated only when the motor-driven zoom mode is selected with zoom mode selecting switch 19. When the zoom switch 21 is actuated by the user, the produced signal is applied to the zoom control unit 20.

The zoom control unit 20 calculates a distance and a direction for driving the magnifying lens based on the focal length information from focal length reader 13, in view of the defocus amount and the distance information calculated by the AF calculating unit 18, the information from the AF calculating unit 18 as to whether the image is focused on said position or not, a signal from the zoom switch 21, and a distance by which the zoom lens is to be driven in a fixed-magnification zoom mode in which the object is photographed in a fixed size with respect to the viewfinder frame irrespective of the distance from the camera to the object.

The calculated distance and the direction for driving the zoom lens are supplied from the zoom control unit 20 to the lens drive circuit 14, which then controls the zoom driver 12 to move the zoom lens L by the calculated distance in the calculated direction along the optical axis. Based on the focus length infomation from the focus length reader 13, the zoom control unit 20 confirms the present focal length of the zoom lens L, and then controls the lens drive circuit 14 to cause the zoom driver 12 to stop the movement of the zoom lens L.

The zoom driver 12 has a zoom lens condition detector (not shown) for detecting whether the zoom lens L is moving along the optical axis or held at rest. The zoom control unit 20 monitors a detected signal from the zoom lens condition detector of the zoom driver 12 and uses the monitored signal in recognizing an end of the focal length range which is reached by the zoom lens L.

When the zoom control unit 20 recognizes that the zoom lens L has reached an end of the focal length range, the zoom control unit 20 also recognized which of the tele and wide ends of the focal length range is reached by the zoom lens L, based on the direction in which the zoom lens L is driven, the direction being determined in the manner described above.

The information relative to the arrival of the zoom lens L at an end of the focal length range, the information relative to the tele or wide end of the focal length range which has been reached by the zoom lens L, and the information relative to the direction in which the zoom lens L is driven, are supplied as corresponding signals to a display energization control unit 22.

In this embodiment, zooming movement of the zoom lens L is effected when the magnifying lens of the zoom lens L is moved along its optical axis by a known control member in the form of a rotatable ring (not shown) on the zoom lens L. More specifically, when the control member is rotated in one direction by hand or an electric motor, the zoom lens axially moves toward the tele end. When the control member is rotated in the opposite direction, the zoom lens axially moves toward the wide end. The direction in which the control member is rotated will sometimes be referred to as the direction in which the zoom lens is rotated.

The zoom lens operation display device shown in FIG. 1 also includes a first blinker circuit 24. When the information from the AF calculating unit 18 indicates that the image is defocused on said position, the first blinker circuit 24 is operated by the display energization control unit 22 to enable a display driver 32 to flash on and off a display unit 30 at a constant period.

The zoom lens operation display device shown in FIG. 1 also includes a second blinker circuit 25. When the zoom control unit 20 detects that the magnifying lens has reached the tele or wide end during its zooming movement, the second blinker circuit 25 is operated by the display energization control unit 22 to enable the display driver 32 to flash on and off the display unit 30 at a period shorter than the period at which the display unit 30 is flashed on and off under the control of the first blinker circuit 24.

When the information from the AF calculating unit 18 indicates that the image is focused on said position, the display energization control circuit 22 operates a display energization circuit 26 to enable the display driver 32 to energize the display unit 30 continuously.

The AF calculating unit 18, the zoom control unit 20, the display energization control unit 22, the first blinker circuit 24, the second blinker circuit 25, the display energization circuit 26, and the display driver 32 jointly serve as a display control means.

Figure 2:
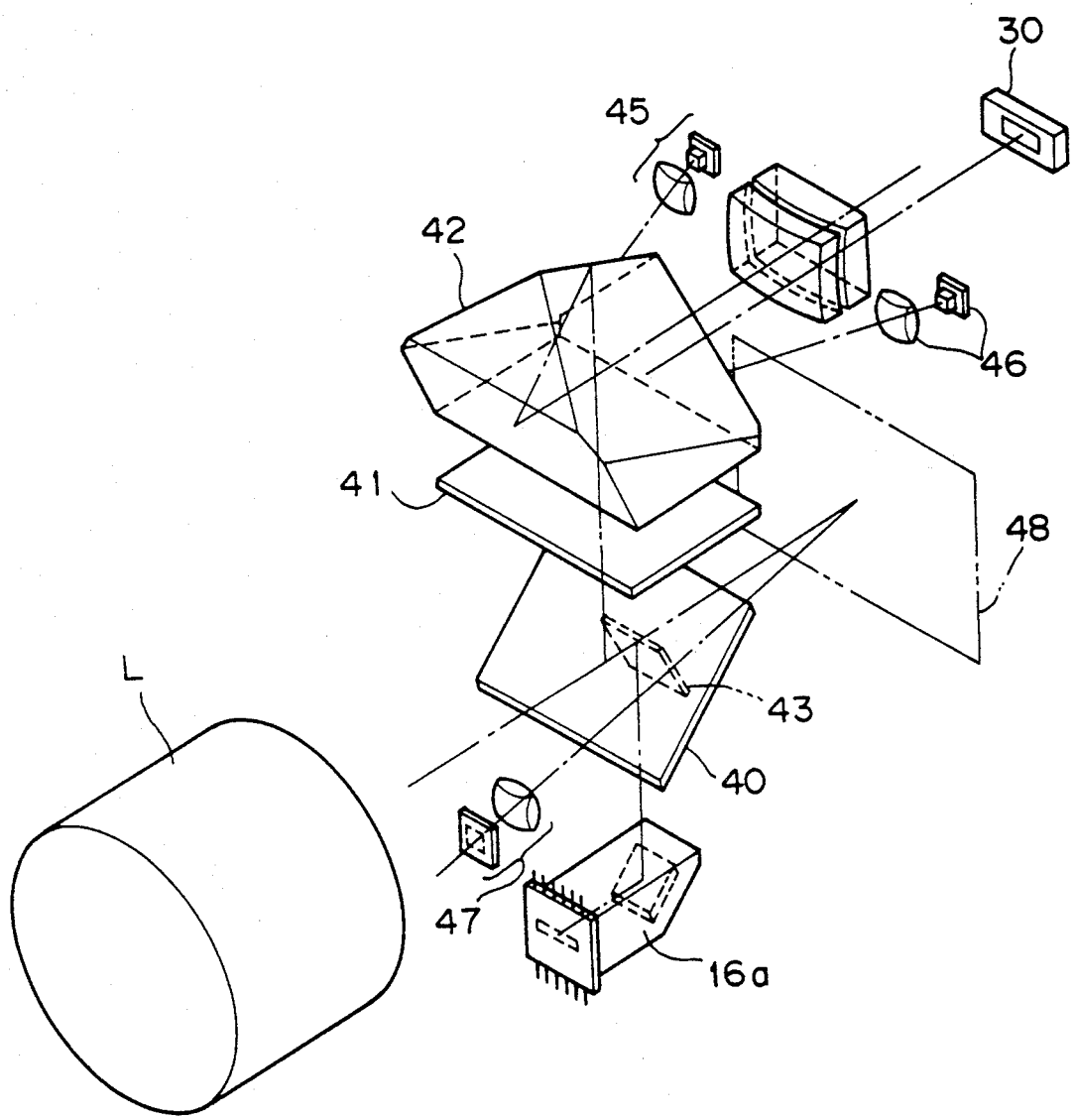
FIG. 2 is a schematic perspective view of optical components of a camera which incorporates the zoom lens operation display device shown in FIG. 1.

FIG. 2 schematically shows the arrangement of optical components of the camera.

Light admitted from the zoom lens L is divided into two rays of light by a main mirror 40. One of the rays of light is reflected by a main mirror 40 and passes through a focusing screen 41 to a pentaprism 42. The other ray of light passes through the main mirror 40 and is reflected by an auxiliary mirror 43 to an AF module 16a of the AF detector 16.

The ray of light directed to the pentaprism 42 forms an image in the viewfinder of the camera. The display unit 30 is positioned in the viewfinder for displaying various indications representing a focused condition, a defocused condition, a tele end, and a wide end. Within the field of the viewfinder, there are seen the image of the object transmitted through the pentaprism 42 and the indications displayed by the display unit 30. The optical components of the camera also include a pair of photometric sensors 45, 46, a TTL photometric sensor 47, and an image area 48 on a photographic film (not shown) in the camera.

Figure 3:
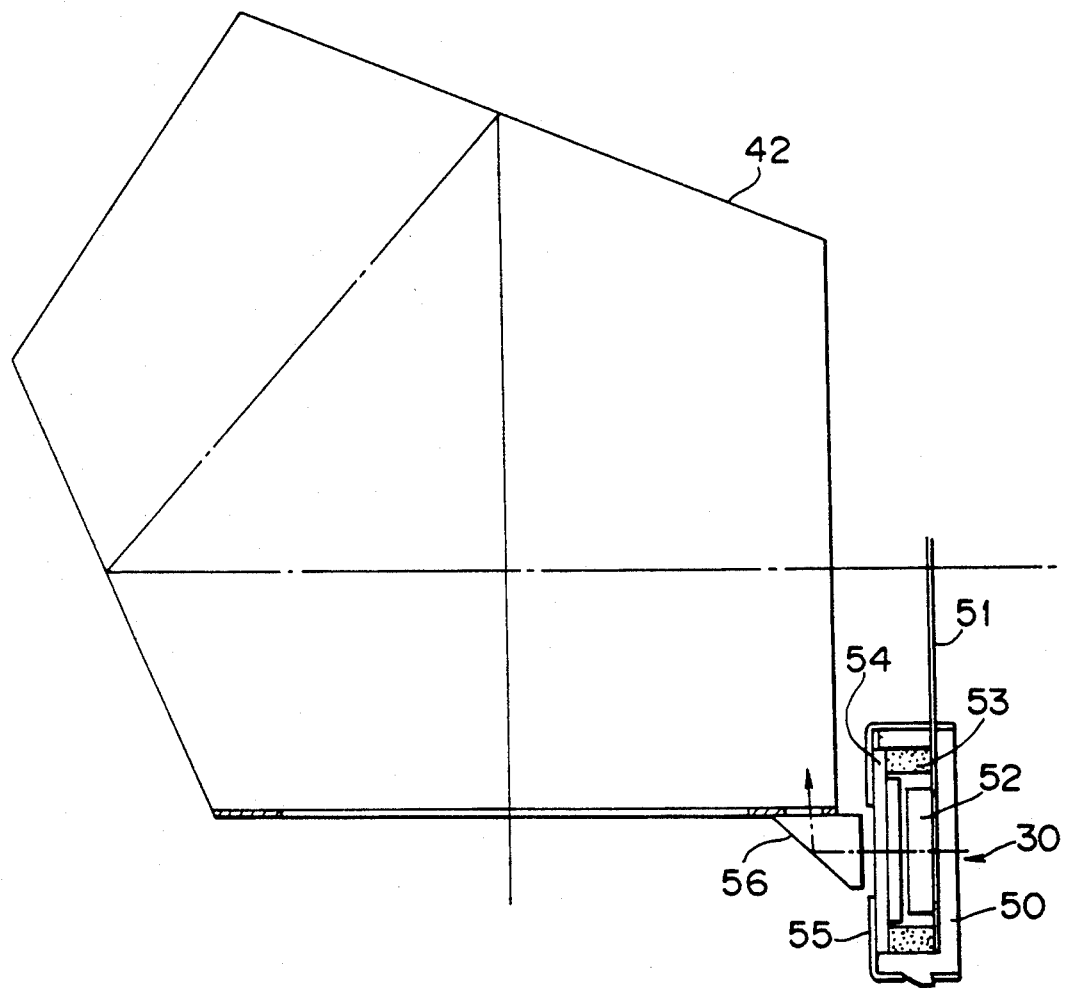
FIG. 3 is a sectional side elevational view of a display unit in the zoom lens operation display device shown in FIG. 1.

FIG. 3 shows the display unit 30 in side elevation.

As shown in FIG. 3, the display unit 30 is positioned behind the pentaprism 42 closer to the viewfinder so that the display unit 30 is viewed in a lower portion of the field of the viewfinder. The display unit 30 has a frame 50 on which a flexible printed-circuit board 51, an LED 52, and a conductive member 53 are mounted. The conductive member 53 supports an LCD 54 thereon. The flexible prined-circuit board 51, the LED 52, the conductive member 53, and the LCD 54 are securely attached to the frame 50 by a holder 55. The LED 52 can display marks for indicating focused and defocused conditions, tele and wide ends of the focal length range of the zoom lens L, and directions of zooming movement. The LED 52 also serves to illuminate the LCD 54. The LCD 54 serves to display photographing information such as of an aperture, a shutter speed, etc. All items of information displayed by the LED 52 and the LCD 54 may be displayed by only the LED 52 or the LCD 54. Light emitted from display unit 30 is transmitted through a smaller prism 56 into the viewfinder optical system of the pentaprism 42 to allow the user to view the marks displayed by the display unit 30 in the lower portion of the field of the viewfinder.

FIGS. 4(A) through 4(G) show the manner in which the marks are displayed by the display unit 30.

The display unit 30 can indicate the focused and defocused conditions in one of two different ways. According to one display mode, only one mark is used to indicate the focused and defocused condition. Specifically, when the image of an object is focused on said position, then the mark is continuously energized or lighted, and when the image is defocused on said position, the mark is intermittently energized, i.e., flashed on and off. According to the other display mode, two marks are used to indicate the focused and defocused conditions, respectively. Specifically, when the image of an object is focused on said position, one of the marks is energized or lighted, and when the image is defocused on said position, the other mark is flashed on and off.

Figure 4A:
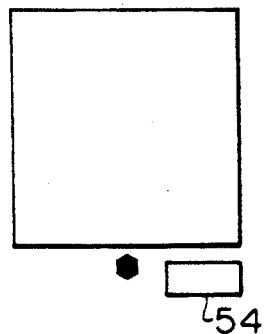
FIGS. 4(A) through 4(G) are diagrams showing various marks or symbols displayed by the display unit shown in FIG. 3.

If the first display mode using a single mark is selected, then when the information from the AF calculating unit 18 indicates a focused condition, the display unit 30 energizes or lights a hexagonal mark as shown in FIG. 4(A) in response to a control signal from the display energization circuit 26. When the information from the AF calculating unit 18 indicates a defocused condition, the display unit 30 flashes on and off a hexagonal mark as shown in FIG. 4(C) in response to a control signal from the first blinker circuit 24. When the zoom control unit 20 detects that the zoom lens reaches either one of the tele or wide end during its zooming movement, the display unit 30 flahses on and off a hexagonal mark as shown in FIG. 4 (E) at a period shorter than the period at which the hexagonal mark shown in FIG. 4(C) is flashed on and off when the image is defocused. The hexagonal mark shown in FIG. 4(E) is flashed on and off in response to a control signal from the second blinker circuit 25.

Figure 4B:
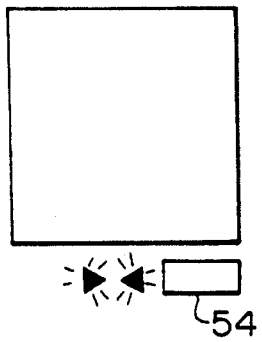
Figure 4C:
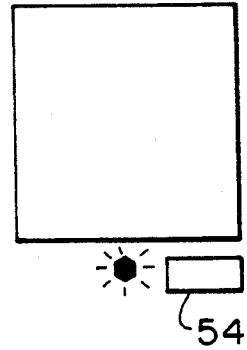

Since the single mark is displayed in different modes as shown in FIGS. 4(A), 4(B), and 4(C), it can selectively display the focused condition, the defocused condition, and the arrival of the zoom lens L at either one of the tele and wide ends of the focal length range, and the user can recognize the focused condition, the defocused condition, and the arrival of the zoom lens L at either one of the tele and wide ends of the focal length range while looking through the viewfinder.

Figure 4D:
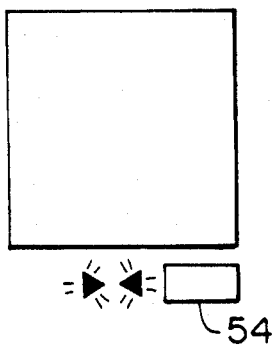
Figure 4E:
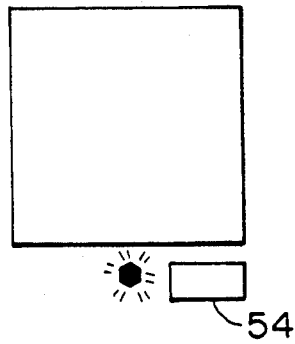

If the second display mode using two marks is selected, then when the information from the AF calculating unit 18 indicates a focused condition, the display unit 30 energizes or lights a hexagonal mark as shown in FIG. 4(A) in response to a control signal from the display energization circuit 26. When the information from the AF calculating unit 18 indicates a defocused condition, the display unit 30 flashes on and off a double arrowhead mark as shown in FIG. 4(B) in response to a control signal from the first blinker circuit 24. When the zoom control unit 20 detects that the zoom lens reaches either one of the tele and wide ends during its zooming movement, the display unit 30 flashes on and off a double arrowhead mark as shown in FIG. 4(D) at a period shorter than the period at which the hexagonal mark shown in FIG. 4(B) is flashed on and off when the image is defocused. The double arrowhead mark shown in FIG. 4(D) is flashed on and off in response to a control signal from the second blinker circuit 25.

Figure 4F:
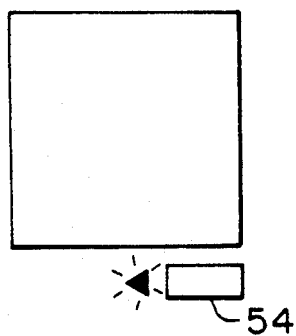
Figure 4G:
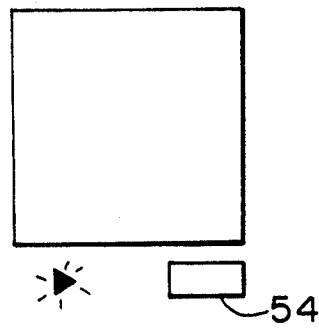

When the zoom control unit 20 detects that the zoom lens L reaches either one of the tele and wide ends, the display unit 30 may display necessary information as follows:

When the direction in which the zoom lens L is rotated is detected by the zoom control unit 20 and either one of the tele and wide ends reached by the zoom lens L is detected by the zoom control unit 20, if the direction in which the zoom lens L is rotated is toward the tele end, then the zoom control unit 20 controls the display energization control unit 22 to operate the second blinker circuit 25 to flash on and off only an arrowhead mark which points in that direction, as shown in FIG. 4(F). Conversely, if the direction in which the zoom lens L is rotated is toward the wide end, then the zoom control unit 20 controls the display energization control unit 22 to operate the second blinker circuit 25 to flash on and off only an arrowhead mark which points in that direction, as shown in FIG. 4(G). Therefore, the user can recognize the tele or wide ends of the focal length range of the zoom lens L simply by viewing the mark in the viewfinder.

In addition to the above display mode, another display mode may be added to indicate the direction of rotation of the zoom lens L only while the zoom lens L is rotating, because the direction in which the zoom lens L rotates is recognized by the zoom control unit 20. Specifically, an arrowhead mark pointing in the direction of rotation of the zoom lens L may be continuously energized or flashed on and off at a period which is prior to and different from the period at which the mark is flashed on and off when the image is defocused on said position and also from the period at which the mark is flashed on and off when an end of the focal length range is reached by the zoom lens L. In this manner, the user of the camera can recognize the direction in which the zoom lens L is rotating simply by looking into the viewfinder.

Processes for displaying the marks shown in FIGS. (A) through 4(G) will be described below with reference to FIGS. 5 through 8.

Figure 5:
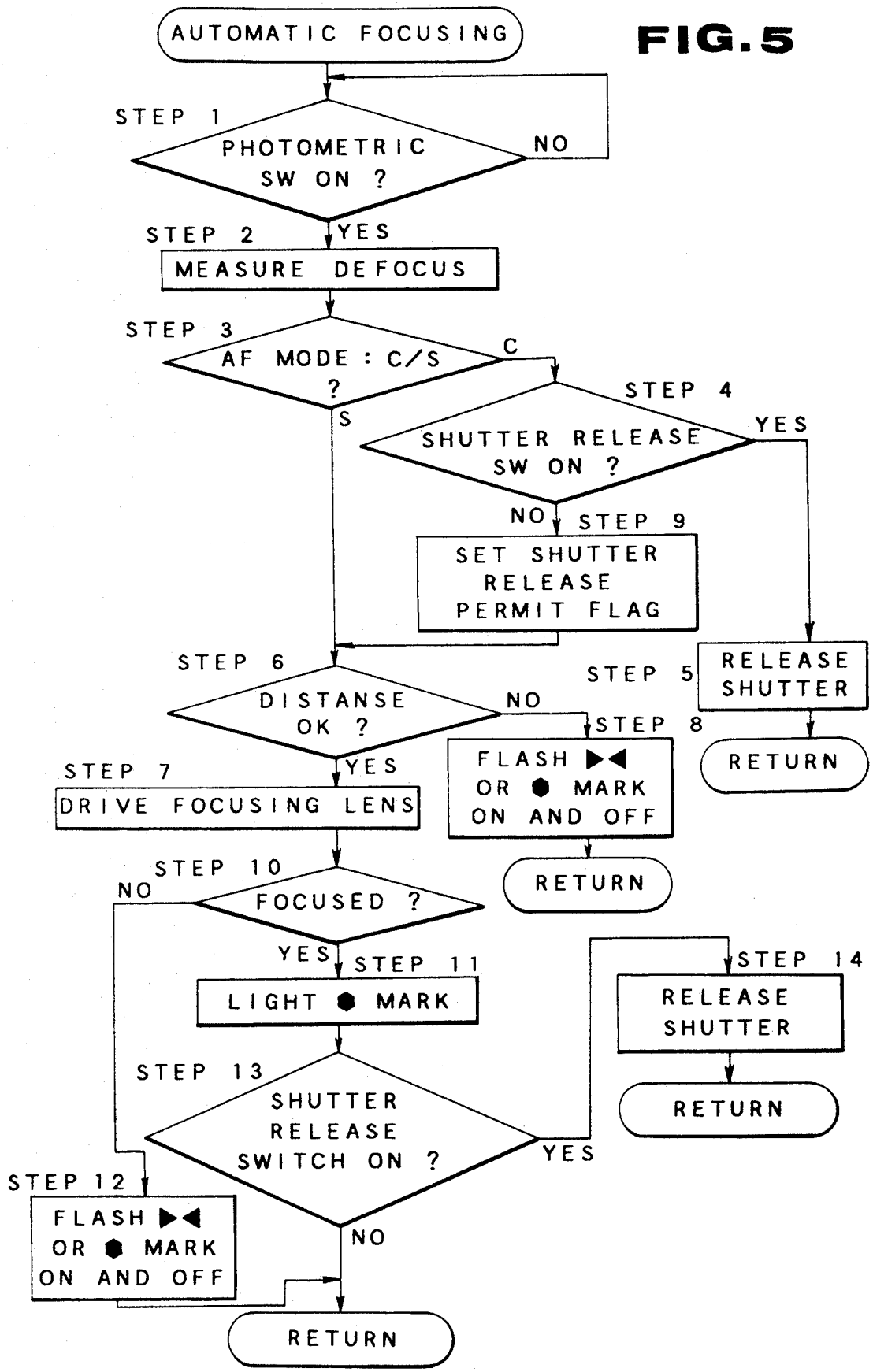
FIGS. 5 through 8 are flowcharts of processes for displaying the marks shown in FIGS. 4(A) through 4(G)

FIG. 5 shows a flowchart of a process for displaying marks when the image of an object is focused or defocused on said position while the camera is in an automatic focusing mode.

If a photometric switch (not shown) is turned on in a step 1, then the defocus amount and the direction of the image of the object starts being measured by the AF detector 16 in a step 2.

If the automatic focusing mode is set to a "CONTINUOUS" mode in which a shutter release overrides focusing, i.e., a shutter release priority mode, in a step 3, then the shutter of the camera is released in a step 5 provided a shutter release switch is turned on to photograph the object in a step 4. If the shutter release switch is not turned on in the step 5, then a shutter release permit flag is set in a step 9, and the execution goes to a step 6.

After the shutter release permit flag is set in the step 9, the execution will jump to the step 5 immediately when the shutter release switch is pressed whichever step is being carried out in the routine shown in FIG. 5.

If the automatic focusing mode is set to a "SINGLE" mode in which focusing overrides a shutter release, i.e., a focusing priority mode, in the step 3, then the AF calculating unit 18 determines whether the defocus amount and the defocus direction of the image of the object can be measured or not by the AF detector 16 in a step 6. If not, then since the image cannot be focused, the double arrowhead mark shown in FIG. 4(B) or the hexagonal mark shown in FIG. 4(C) is flashed on and off in a step 8. More specifically, the AF calculating unit 18 applies a signal indicating the defocused condition to the display energization control unit 22, which controls the first blinker circuit 24 and the display driver 32 to energize the display unit 30 for flashing on and off the double arrowhead mark shown in FIG. 4(B) or the hexagonal mark shown in FIG. 4(C). If the defocus amount and defocus direction can be measured in the step 6, then they are measured, and the focusing lens of the zoom lens L is driven in a step 7.

Then, the AF calculating unit 18 determines whether the image of the object is focused on said position or not in a step 10. If the image of the object is focused on said position in the step 10, then the display energization control unit 22 controls the display energization circuit 26 and the driver 32 to cause the display unit 30 to continuously energize or light the hexagonal mark shown in FIG. 4(A) in a step 11. If the image of the object is defocused on said position in the step 10, then the display energization control unit 22 controls the first blinker circuit 24 and the driver 32 to cause the display unit 30 to flash on and off the double arrowhead mark shown in FIG. 4(B) or the hexagonal mark shown in FIG. 4(C) in a step 12. Then, control returns to the main routine.

After the step 11, if the release switch is turned on in a step 13, then the shutter is released to photograph the object in a step 14. If the shutter switch is not turned on in the step 13, then the execution returns to the main routine.

Figure 6:
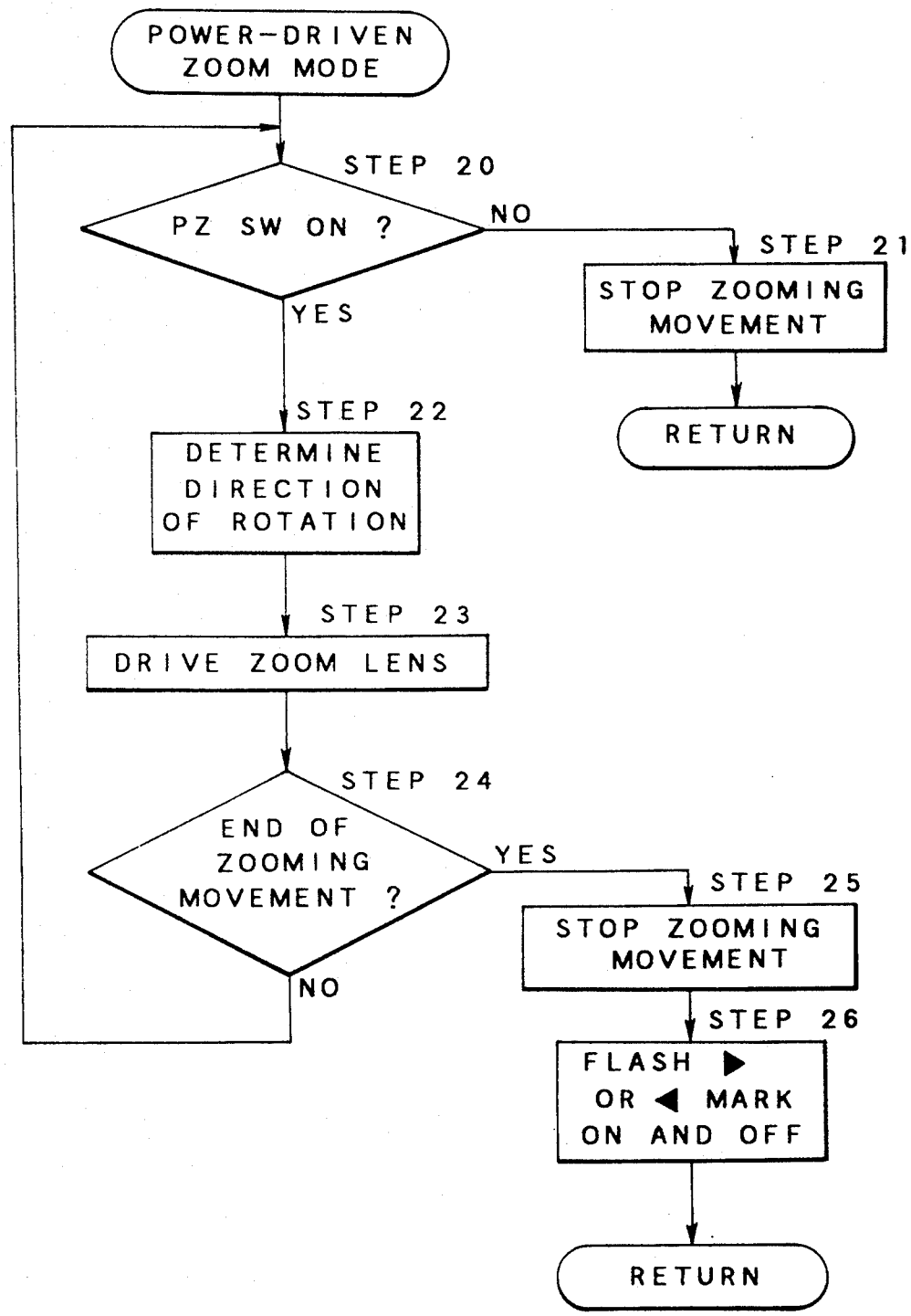

FIG. 6 shows a flowchart of a process for displaying a mark in the motor-driven zoom mode which is manually initiated by the zoom switch 21 for moving the zoom lens L toward the tele or wide end.

If the zoom switch 21 is not turned on in a step 20, then zooming movement of the zoom lens L is stopped by the zoom driver 12 in a step 21. If the zoom switch 21 is turned on in the step 20, then the zoom control unit 20 determines the direction in which the zoom lens L is to be rotated, i.e., toward the tele end or the wide end, depending on the signal from the zoom switch 21, in a step 22. According to the determined direction, the zoom control unit 20 controls the lens drive circuit 14 and the zoom driver 12 to move the zoom lens L in a step 23 while the zoom switch 21 is being pressed.

When the zoom lens L reaches the tele or wide end of the focal length range before the zoom switch 21 is released, the zoom control unit 20 recognizes the arrival of the zoom lens L at the tele or wide end and also which of the tele and wide ends is reached by the zoom lens L based on the direction of rotation of the zoom lens L, in a step 24. Thereafter, the zooming movement of the zoom lens L is stopped in a step 25.

If the tele end is reached, the arrowhead mark shown in FIG. 4(F) is flashed on and off by the display unit 30, and if the wide end is reached, the arrowhead mark shown in FIG. 4(G) is flashed on and off by the display unit 30, in a step 26. Alternatively, the marks shown in FIGS. 4(D) and 4(E) may be displayed. At this time, the display unit 30 is controlled by the display energization control unit 22 through the second blinker circuit 25 and the display driver 32.

Figure 7:
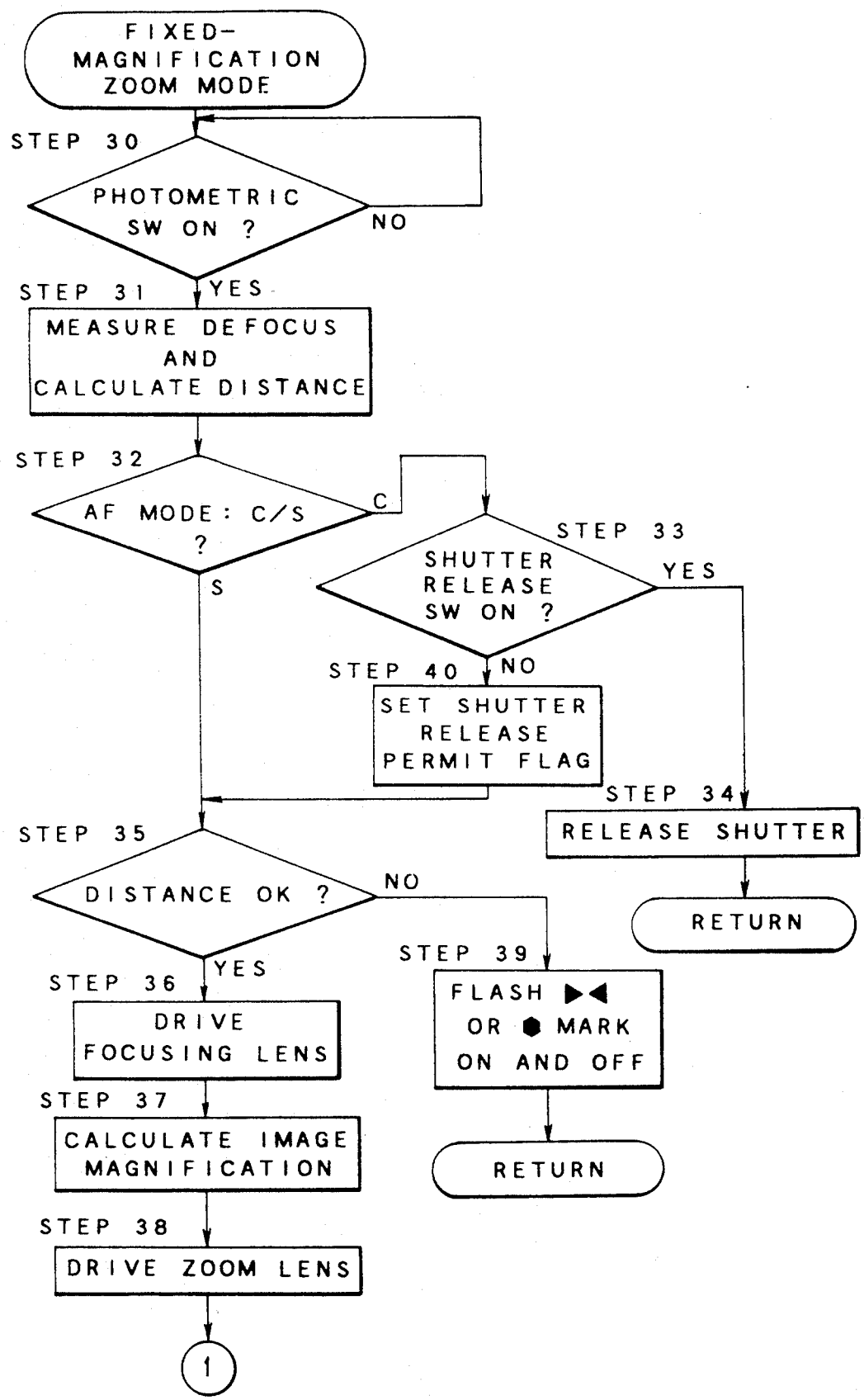
Figure 8:
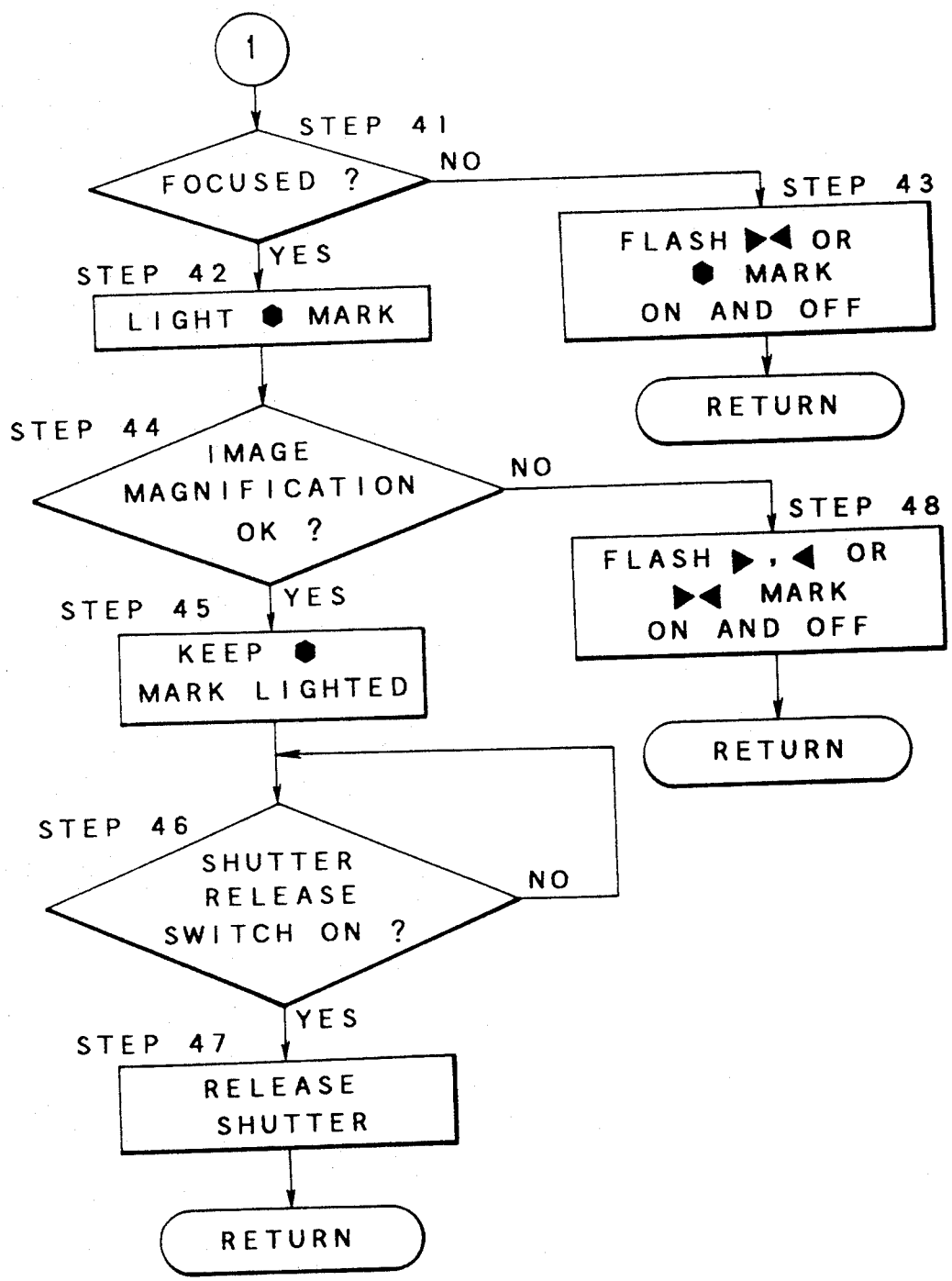

FIGS. 7 and 8 show a flowchart of a process for displaying marks in a fixed-magnification zoom mode (i.e., one example of a control zoom mode) in which zooming movement of the zoom lens L is automatically controlled so that the size of the image of an object on a photographic film remains the same irrespective of the distance from the camera to the object.

If the photometric switch is turned on in a step 30, then the defocus amount and the defocus direction of the image of the object starts being measured by AF detector 16 and the distance from the camera to the object starts being calculated by the AF calculating unit 18 in a step 31.

If the automatic focusing mode is set to the "CONTINUOUS" mode or the shutter release priority mode in a step 32, then the shutter of the camera is released in a step 34 provided a shutter release switch is turned on to photograph the object in a step 33. If the shutter release switch is not turned on in the step 33, then a shutter release permit flag is set in a step 40, and the execution goes to a step 35.

If the automatic focusing mode is set to the "SINGLE" mode or the focusing priority mode in the step 32, then the AF calculating unit 18 determines whether the defocus amount and the defocus derection of the image of the object can be measured or not by the AF detector 16 in a step 35. If the defocus amount and the defocus direction can be measured in the step 35, then they are measured, and the focusing lens of the zoom lens L is driven in a step 36. The magnification of the image is calculated and then the distance and the direction for driving the zoom lens L is calculated by the zoom control unit 20 in a step 37, and the zoom lens L is driven in a step 38.

If the defocus amount or the defocus direction cannot be measured, then since the image cannot be focused on said plane, the double arrowhead mark shown in FIG. 4(B) or the hexagonal mark shown in FIG. 4(C) is flashed on and off in a step 39. More specifically, the AF calculating unit 18 applies a signal to the display energization control unit 22, which controls the first blinker circuit 24 and the display driver 32 to energize the display unit 30 for flahsing on and off the double arrowhead mark or the hexagonal mark.

Then, the AF calculating unit 18 determines whether the image of the object is focused on said position or not in a step 41. If the image of the object is focused on said position in the step 41, then the display energization control unit 22 controls the display energization circuit 26 and the driver 32 to cause the display unit 30 to energize or light the hexagonal mark as shown in FIG. 4(A) in a step 42. If the image of the object is defocused on said position in the step 41, then the display energization control unit 22 controls the first blinker circuit 24 and the driver 32 to cause the display unit 30 to flash on and off the double arrowhead mark as shown in FIG. 4(B) or the hexagonal mark shown in FIG. 4(C) in a step 43.

Then, the zoom control unit 20 determines whether the magnification of the image of the object formed through the zoom lens L has reached the magnification calculated in the step 37. If the magnification of the image reaches the calculated magnification in a step 44, the hexagonal mark remains energized in a step 45. If the release switch is turned on in a step 46, then the shutter is released to photograph the object in a step 47.

If the magnification of the image has not reached the calculated magnification in the step 44, and the zoom control unit 20 recognized that the zoom lens L has reached an end of the focal length range, then the zoom control unit 20 also determines whether the end of the focal length range is the tele end or the wide end based on the direction of zooming movement of the zoom lens L. If the tele end is reached, then the arrowhead mark shown in FIG. 4(F) is flashed on and off by the display unit 30, and if the wide end is reached, the arrowhead mark shown in FIG. 4(G) is flashed on and off by the display unit 30, in a step 48. Alternatively, the marks shown in FIGS. 4(D) or 4(E) may be displayed. At this time. the display unit 30 is controlled by the display energization control unit 22 through the second blinker circuit 25 and the display driver 32.

With the above embodiment, the tele and wide ends of the focal length range of the zoom lens L are displayed by the display unit 30 which also displays the focused and defocused conditions of the image. When the tele or wide end is reached, the hexagonal or arrowhead mark is flashed on and off at a period different from the period at which it is flashed on and off when the image is defocused on said position. However, when the tele or wide end is reached, the arrowhead mark may simply be energized or lighted rather than being flashed on and off.

The tele and wide ends may be displayed only when zooming movement of the zoom lens is automatically controlled by a signal from the camera, i.e., in the motor-driven zoom mode or the control zoom mode other than the manual zoom mode. According to such an alternative, the number of display modes is reduced, resulting in a reduction in the cost of the camera and an increase in the ease with which the camera is used, as compared with cameras that have all display modes with respect to operation of zoom lenses.

Further, the camera of this embodiment has a self-timer mechanism 33 (FIG. 1) to release the shutter of the camera with a preset time delay, as well as an alarm 34 (FIG. 1), which is an alarm sound generator, such as a PCV or buzzer, for producing an alarm sound when the self-timer mechanism 33 is used for photographing. The alarm sound generator 34 may be arranged to produce a different alarm sound when one of the tele and wide ends is reached, from the sound which are produced when the self-timer mechanism 33 is used. The produced alarm sound then assists the user in recognizing the tele and wide ends more reliably in combination with the marks displayed in the viewfinder.

A zoom lens operation display device for a camera according to a second embodiment of the present invention will be described below with reference to FIGS. 9 through 11. The zoom lens operation display device according to the second embodiment includes an additional component in addition to all the components of the zoom lens operation display device according to the first embodiment. Those parts of the second embodiment which are identical to those of the first embodiment are denoted by identical reference numerals, and will not be described in detail.

Figure 9:
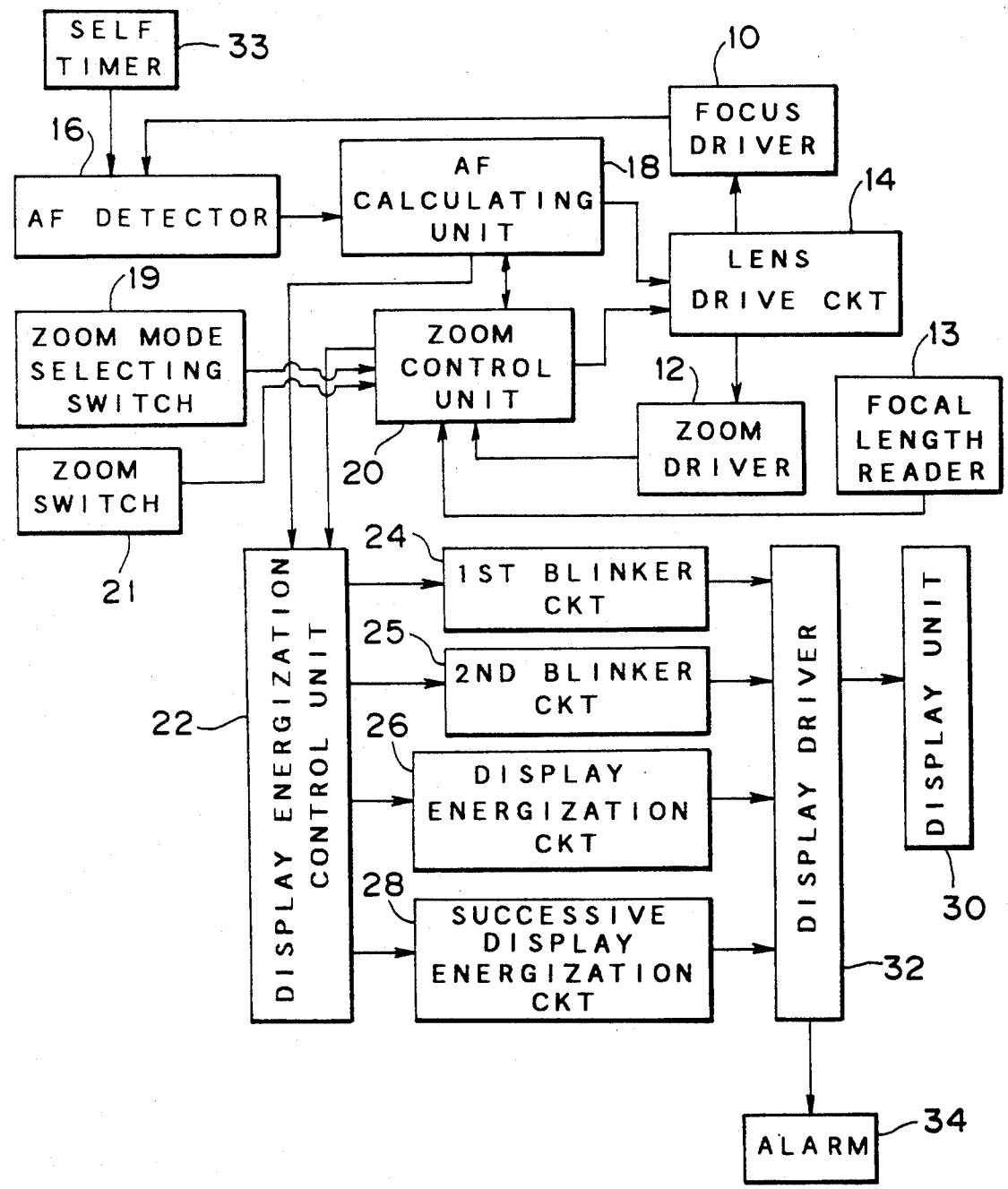
FIG. 9 is a block diagram of a zoom lens operation display device for a camera according to a second embodiment of the present invention.

FIG. 9 shows in block diagram the zoom lens operation display device according to the second embodiment of the present invention. The zoom lens operation display device includes a focus driver 10, a zoom driver 12, a lens drive circuit 14, an AF detector 16, and an AF calculating unit 18, which are identical to those described with reference to FIG. 1. A zoom mode selecting switch 19 selects one at a time of a manual zoom mode, a motor-driven zoom mode, and a control zoom mode.

The zoom control unit 20 calculates a distance and a direction for driving the magnifying lens based on the focal length information from the focal length reader 13, in view of the focus and defocus information calculated by the AF calculating unit 18, a zoom mode selected by the zoom mode selecting switch 19, and a distance by which the zoom lens is to be driven in the selected zoom mode. Calculated information as to the distance and the direction for driving the magnifying lens is supplied to the lens drive circuit 14, which controls the zoom driver 12 to move the magnifying lens based on the supplied information.

The information from the AF calculating unit 18 as to whether the image is focused on said position or not, the information detected by the zoom control unit 20 as to the direction in which the zoom lens is zoomed, and the information as to a zoom mode selected by the zoom mode selecting switch 19 are supplied to a display energization control unit 22.

When the control zoom mode is selected by the zoom mode selecting switch 19, or when a focused or defocused condition is detected by the AF calculating unit 18, the display energization circuit 26 operates to cause a display driver 32 to continuously energize or light a display unit 30.

When the motor-driven zoom mode is detected by the zoom control unit 20, a successive display energization circuit 28 operates to cause the driver 32 to successively energize or light the display unit 30.

The AF calculating unit 18, the zoom control unit 20, the display energization control unit 22, the first blinker circuit 24, the second blinker circuit 25, the display energization circuit 26, the successive display energization control circuit 28, and the display driver 32 jointly serve as a display control means.

The optical components of the camera, which are shown in FIG. 2 and described with respect to the display unit 30 according to the first embodiment, are also employed in combination with the display unit 30 according to the second embodiment. Therefore, those optical component will not be described in detail with respect to the display unit 30. It is to be noted, however, that the display unit 30 according to the second embodiment is capable of displaying focused and defocused conditions, tele and wide ends of the focal length range of the zoom lens, a direction of zooming movement, and a zoom mode selected by the zoom mode selecting switch 19. Within the field of the viewfinder, there are seen the image of the object transmitted through the pentaprism and the indications displayed by the display unit 30.

The display unit 30 according to the second embodiment is basically of the same construction as that of the display unit 30 according to the first embodiment, as shown in FIG. 3. The LED of the display unit 30 can display marks for indicating focusd and defocused conditions, tele and wide ends of the focal length range of the zoom lens, a direction of zooming movement, and a zoom mode selected by the zoom mode selecting switch 19.

The zoom lens operation display device according to the second embodiment operates in the same manner as in the first embodiment, and also additionally operates to display marks as shown in FIGS. 10(A) through 10(E).

Figure 10A:
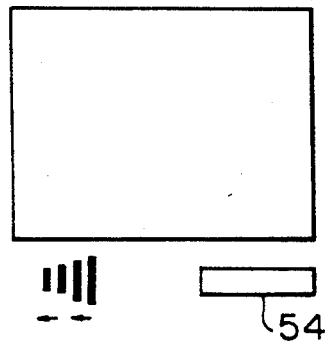
FIGS. 10(A) through 10(E) are diagrams showing marks or symbols displayed by the display unit shown in FIG. 9.
Figure 10B:
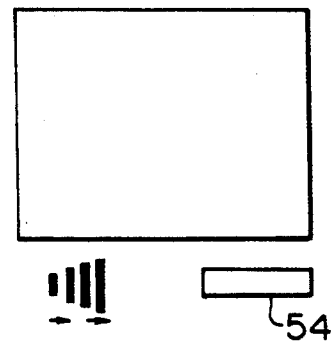

When the motor-driven zoom mode is selected by the zoom mode selecting switch 19 and the zoom lens is moved by the motor in response to a signal from the zoom switch 21, the display unit 30 displays a bar-code-like mark as shown in FIGS. 10(A) and 10(B), the mark being composed of vertical bars which are progressively longer in one direction. More specifically, when the zoom lens is moved toward the wide end during its zooming movement, the bars of the mark are successively energized or lighted from the right to the left, as shown in FIG. 10(A), in repeated cycles during the zooming movement. When the zoom lens is moved toward the tele end during its zooming movement, the bars of the mark are successively energized or lighted from the left to the right, as shown in FIG. 10(B), in repeated cycles during the zooming movement. In this manner, the direction of zooming movement is visually displayed in the viewfinder, allowing the user to perceive the direction of zooming movement with ease.

Figure 10C:
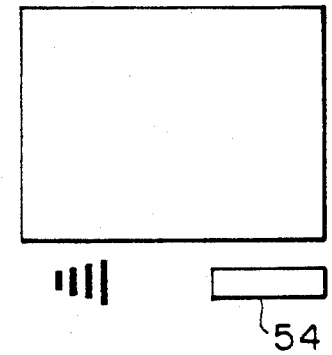
Figure 10D:
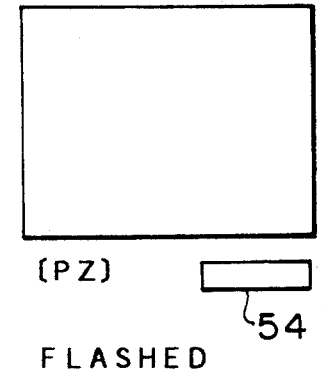

While the zoom lens is being thus driven, letters "PZ" indicating that the zoom lens is motor-driven may be flashed on and off by the display unit 30, as shown in FIG. 10(D), letting the user know that the motor-driven zoom mode is selected.

Figure 10E:
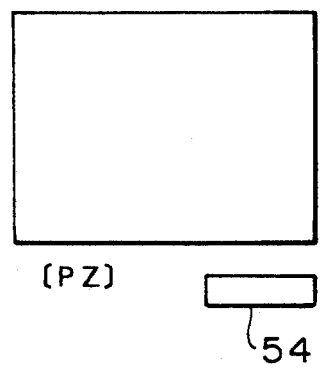

When the control zoom mode is selected by the zoom mode selecting switch 19, all the bars of the mark are energized or lighted as shown in FIG. 10(C), so that the user can easily recognize the control zoom mode which is selected. In the control zoom mode, the letters "PZ" may instead be continuously energized or lighted by the display unit 30, as shown in FIG. 10(E), letting the user know that the control zoom mode is selected.

While the zoom lens L is being driven, the mark shown in FIG. 10(A) or 10(B) is displayed depending on the direction of rotation of the zoom lens L. When the zoom lens L is at rest, such as when the camera is in a condition preparatory for taking a picture or is operating to take a picture, the mark shown in FIG. 10(C) or 10(E) may be displayed.

When the motor-driven zoom mode or the control zoom mode is selected, the display unit 30 may display information in addition to the above indications, as follows:

In the motor-driven zoom mode, the letters "PZ" are flashed on and off as shown in FIG. 10(D) while the zoom lens L is being driven, and the bars shown in FIG. 10(A) or 10(B) may be successively energized in repeated cycles depending on the direction in which the zoom lens L is driven.

In the control zoom mode, the letters "PZ" are continuously energized as shown in FIG. 10(E), and the bars shown in FIG. 10(A) or 10(B) may be successively energized in repeated cycles depending on the direction in which the zoom lens L is driven, while the zoom lens L is being driven.

In the case where the above alternative display modes are employed, whether the motor-driven zoom mode or the control zoom mode is selected can be recognized by different ways in which the letters "PZ" are displayed, and the direction in which the zoom lens L is driven can be ascertained in each of the motor-driven zoom mode and the control zoom mode.

Figure 11:
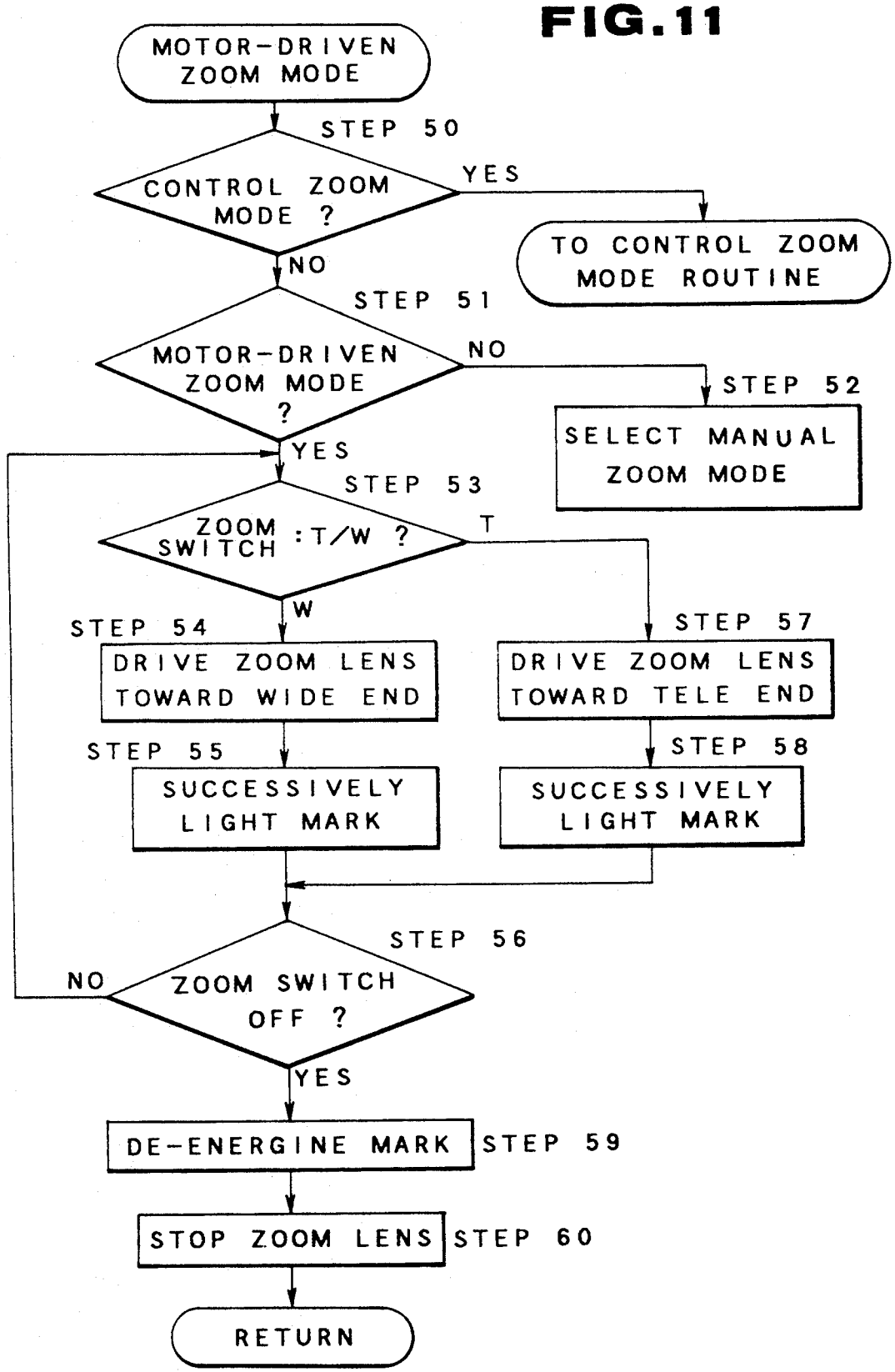
FIG. 11 is a flowchart of a process for displaying the marks shown in FIGS. 10(A) through 10(E).

FIG. 11 shows a flowchart of a process for displaying the mark when the motor-driven zoom mode is selected by the zoom mode selecting switch 19.

The zoom control unit 20 determines whether the control zoom mode or the motor-driven mode is selected by the zoom mode selecting switch 19 in a step 50. If the control zoom mode is selected, then control goes to the control zoom mode. If neither the control zoom mode nor the motor-driven zoom mode is selected, then the manual zoom mode is selected, allowing the zoom lens to be manually moved in a step 52. In this case, none of the displays using the marks as shown in FIGS. 10(A) through 10(E) are performed.

In the motor-driven zoom mode, while the zoom switch 21 is being shifted to the tele side in a step 53, the zoom driver 12 moves the zoom lens toward the tele end in a step 57, and the display energization control unit 22 controls the successive display energization circuit 28 and the driver 32 to cause the display unit 30 to successively energize or light the bars of mark, as shown in FIG. 10(B), in a step 58.

While the zoom switch 21 is being shifted to the wide side in the step 53, the zoom driver 12 moves the zoom lens toward the wide end in a step 54, and the display energization control unit 22 controls the successive display energization circuit 28 and the driver 32 to cause the display unit 30 to successively energize or light the bars of mark, as shown in FIG. 10(A), in a step 55.

When the zoom switch 21 is turned off in a step 56, the display energization control unit 22 de-energizes the display unit 30 in a step 59, and the zoom driver 12 deactivates the zoom lens in a step 60.

When the motor-driven zoom mode is selected in the step 51, the letters "PZ" may be flashed on and off as shown in FIG. 10(D).

If the control zoom mode is selected in the step 50, then the mark shown in FIG. 10(C) or 10(E) is displayed when the camera is in a preparatory condition in which the zoom lens L is not zoomed. While the zoom lens L is zoomed by the distance and in the direction which are calculated by the zoom control unit 20, the mark is displayed as shown in FIG. 10(A) or 10(B) depending on the direction in which the zoom lens is moved. The control zoom mode of this embodiment is the fixed-magnification zoom mode previously described, but is not limited to it. There may be many other control zoom modes such as, for example, the exposure zoom mode, in which the zoom lens is zoomed while the film in the camera is being exposed. When such kind of control zoom mode is effected, the direction of zooming movement may be displayed as shown in FIG. 10(A) or 10(B).

In this embodiment, the display unit 30 displays the selection of the motor-driven mode and the direction of zooming movement, i.e., the direction in which the zoom lens is driven, in the motor-driven mode, and displays the selection of the control zoom mode and the direction of zooming movement, in the control zoom mode. The user can thus visually recognize the direction of zooming movment and the selected zoom mode while seeing through the viewfinder.

Although certain preferred embodiments have been shown and described, it should be understood that many changes and modifications may be made therein without departing from the scope of the appended claims.

We claim:

1. A camera comprising:
a zoom lens having a variable focal length over a predetermined focal length range;
means for zooming said zoom lens in a plurality of different zoom modes, said plurality of zoom modes including a manual zoom mode, a motor-driven zoom mode, and a control zoom mode;
selection means for selecting one of said zoom modes, to be used by said means for zooming said zoom lens;
display means;
display control means for controlling said displaying means in response to said selection means, so as to display the zoom mode that is selected by said selection means, wherein said zoom lens is movable for varying the focal length thereof, wherein ends of said focal length range comprise a tele end and a wide end corresponding to the longest and the shortest focal lengths of said zoom lens, respectively, and wherein said display control means comprises means for controlling said display means, based on the direction in which said zoom lens is moved, to make a display to indicate one of said tele and wide ends at which the focal length of said zoom lens resides;
said means for zooming said zoom lens comprising:
drive means for driving said zoom lens in directions toward said tele and wide ends; and
drive signal output means for applying a signal to said drive means to drive said zoom lens in either direction toward said tele or wide end; and
wherein said display control means comprises means for controlling said display means to display the motor-driven mode and the direction in which said zoom lens is driven based on the signal from said drive signal output means when the motor-driven zoom mode is selected by said selection means, and for controlling said display means to display the control zoom mode and the direction in which said zoom lens is driven when the control zoom mode is selected by said selection means.

2. A camera according to claim 1 further comprising a viewfinder, said display means comprising means for displaying information in said viewfinder.

3. A camera according to claim 1, wherein said display control means further comprises means for controlling said display means to display an operated condition of said zoom lens.

4. A camera according to claim 1, wherein said display means comprises at least one of an LED or an LCD.

5. A camera according to claim 1, wherein said display control means comprises means for controlling said display means to display the zoom mode and the direction in a display mode when said motor-driven zoom mode is selected, and to display the zoom mode in different display mode when said control zoom mode is selected.

6. A camera comprising:
a zoom leans having a variable focal length over a predetermined focal length range, said focal length range having a tele end and a wide end thereof corresponding to the longest and the shortest focal lengths of said zoom lens, respectively;
an automatic focusing mechanism for automatically focusing on a predetermined plane the image of an object which is formed through said zoom lens;
display means for producing visible representations;
display control means for controlling said display means to produce a selected one of a plurality of visible representations;
first detecting means for detecting focused and defocused conditions of the image of the object;
second detecting means for detecting a position of said zoom lens with respect to the focal length thereof between said tele and wide ends; and
said display control means comprising a first display control unit operatively connected to said first detecting means, for controlling said display means to display, by using a mark the focused or defocused condition of said zoom lens in a first display mode when said automatic focusing mechanism is operated, and a second display control unit operatively associated with said second detecting means, for controlling said display means to display, using said mark, arrival of said zoom lens at one of said tele and wide ends in a second display mode which is different from said first display mode, wherein the same mark is used in both said first and second display modes.

7. A camera comprising:
a zoom lens having a variable focal length over a predetermined focal length range, said focal length range having ends thereof corresponding to the longest and the shortest focal lengths of said zoom lens, respectively;
zoom lens condition detection means for detecting an operated condition of said zoom lens;
detection means for detecting in response to said zoom lens condition detection means, the focal length of said zoom lens being at one of said ends of said focal length range; and
display means for displaying, in response to said detection means, an indication that the focal length of said zoom lens is at one of said ends of said focal length range, wherein said display means comprises means for displaying a plurality of bars having progressively varying lengths and successively or simultaneously energizable to display the zoom mode and the direction.

8. A camera according to claim 1, further comprising:
an automatic focusing mechanism for automatically focusing on a predetermined plane the image of an object which is formed through said zoom lens;
said display means including means for displaying a focused or defocused condition of the image in a first display mode; and
display control means for controlling said display means to display said indication that the focal length of said zoom lens is at one of said ends of said focal length range, in a second display mode different from said first display mode.

9. A camera according to claim 8, wherein said display control means comprises means for intermittently energizing said display means in a predetermined period so as to provide said indication that the focal length of said zoom lens is at one of said ends of said focal length range.

10. A camera according to claim 8 wherein said zoom lens is rotatable for varying the focal length thereof, wherein said ends of said focal length range comprises a tele end and a wide end corresponding to the longest and the shortest focal lengths of said zoom lens, respectively, and wherein said display control means comprises means for controlling said display means, based on the direction in which said zoom lens is rotated, to make a display to indicate one of said tele and wide ends at which the focal length of said zoom lens resides.

11. A camera according to claim 9, wherein said display control means is operable only when said zoom lens is being automatically controlled in response to a signal from the camera.

12. A camera according to claim 8, further comprising a viewfinder, said display means comprising means for displaying information in said viewfinder.

13. A camera according to claim 8 further comprising zoom mode selecting means for selecting one of a manual zoom mode, a motor-driven zoom mode, and a control zoom mode for moving said zoom lens, said display control means comprising means for controlling said display means to display a selected one of said manual, motor-driven, and control zoom modes.

14. A camera according to claim 13, wherein said display control means further comprises means for controlling said display means to display an operated condition of said zoom lens.

15. A camera according to claim 13, wherein said ends of said focal length range comprises a tele end and a wide end corresponding to the longest and the shortest focal lengths of said zoom lens, respectively, further including:
drive means for driving said zoom lens in directions toward said tele and wide ends; and
drive signal output means for applying a signal to said drive means to drive said zoom lens in either direction toward said tele or wide end.

16. A camera according to claim 15, wherein said display control means comprises means for controlling said display means to display the motor-driven mode and the direction in which said zoom lens is driven based on the signal from said drive signal output means when the motor-driven zoom mode is selected by said zoom mode selecting means, and for controlling said display means to display the control zoom mode and the direction in which said zoom lens is driven when the control zoom mode is selected by said zoom mode selecting means.

17. A camera according to claim 1, wherein said display means comprises at least one of an LED or an LCD.

18. A camera according to claim 16, wherein said display control means comprises means for controlling said display means to display the zoom mode and the direction in a display mode when said motor-driven zoom mode is selected, and to display the zoom mode in different display mode when said control zoom mode is selected.

19. A camera comprising:
a zoom lens having a variable focal length over a predetermined focal length range, said focal length range having a tele end and a wide end thereof corresponding to the longest and the shortest focal lengths of said zoom lens, respectively;
means for zooming said zoom lens in directions toward said tele and wide ends;
detection means for detecting, during a zooming operation of said zoom lens, the direction of that zooming operation;
display means; and
display control means for controlling said display means in response to said detection means, so as to display the zooming direction that is detected by said detection means.

20. A camera according to claim 19, wherein said zoom lens is rotatable for varying the focal length thereof, and wherein said display control means comprises means for controlling said display means, based on the direction in which said zoom lens is rotated, to make a display to indicate one of said tele and wide ends at which the focal length of said zoom lens resides.

21. A camera according to claims 19, wherein said display control means is operable only when said zoom lens is being automatically controlled in response to a signal from the camera.

22. A camera according to claim 19, further comprising a viewfinder, said display means comprising means for displaying information in said viewfinder.

23. A camera according to claim 19, further comprising zoom mode selecting means for selecting one of a manual zoom mode, motor-driven zoom mode, and a control zoom mode for moving said zoom lens, said display control means comprising means for controlling said display means to display a selected one of said manual, motor-driven, and control zoom.

24. A camera according to claim 19, wherein said display control means further comprises means for controlling said display means to display an operated condition of said zoom lens.

25. A camera according to claim 23, wherein said means for zooming said zoom lens comprises;
drive means for driving said zoom lens in directions toward said tele and wide ends; and
drive signal output means for applying a signal to said drive means to drive said zoom lens in either direction toward said tele or wide end.

26. A camera according to claim 25, wherein said display control means comprises means for controlling said display means to display the motor-driven mode and the direction in which said zoom lens is driven based on the signal from said drive signal output means when the motor-driven zoom mode is selected by said zoom mode selecting means, and for controlling said display means to display the control zoom mode and the direction in which said zoom lens is driven when the control zoom mode is selected by said zoom mode selecting means.

27. A camera according to claim 19, wherein said display means comprises at least one of an LED or an LCD.

28. A camera according to claim 26, wherein said display control means comprises means for controlling said display means to display the zoom mode and the direction in a display mode when said motor-driven zoom mode is selected, and to display the zoom mode in different display mode when said control zoom mode is selected.

29. A camera comprising:
- a zoom lens having variable focal length over a predetermined focal length range, said focal length range having ends thereof corresponding to the longest and the shortest focal lengths of said zoom lens, respectively;
- zoom leans condition detection means for detecting an operated condition of said zoom lens;
- detection means for detecting in response to said zoom lens condition detection means, the focal length of said zoom lens being at one of said ends of said focal length range;
- display means for displaying, in response to said detection means, an indication that the focal length of said zoom lens is at one of said ends of said focal length range;
- an automatic focusing mechanism for automatically focusing on a predetermined plane an image of an object which is formed through said zoom lens;
- said display means including means for displaying a focused or defocused condition of the image in a first display mode; and
- display control means for controlling said display means to display said indication that the focal length of said zoom lens is at one of said ends of said focal length range, in a second display mode different from said first display mode;
- zoom mode selecting means for selecting one of a manual zoom mode, a motor-driven zoom mode, and a control zoom mode for moving said zoom lens, said display control means comprising means for controlling said display means to display a selected one of said manual, motor-driven, and control zoom modes;
- said ends of said focal length range comprising a tele end and a wide end corresponding to the longest and the shortest focal lengths of said zoom lens, respectively;
- drive means for driving said zoom lens in directions toward said tele and wide ends;
- drive signal output means for applying a signal to said drive means to drive said zoom lens in either direction toward said tele or wide end; and
- wherein said display control means comprises means for controlling said display means to display the motor-driven mode and the direction in which said zoom lens is driven based on the signal from said drive signal output means when the motor-driven zoom mode is selected by said zoom mode selecting means, and for controlling said display means to display the control zoom mode and the direction in which said zoom lens is driven when the control zoom mode is selected by said zoom mode selecting means.

* * * * *

UNITED STATES PATENT AND TRADEMARK OFFICE
CERTIFICATE OF CORRECTION

PATENT NO. : 5,231,442
DATED : July 27, 1993
INVENTOR(S) : Toshiyuki KITAZAWA

It is certified that error appears in the above-indentified patent and that said Letters Patent is hereby corrected as shown below:

On the cover page, at section [75] , after "Goto" insert
---Hiroaki Suzuki---, and change "both" to ---all---.
On the cover page, section [56], line 2 under U.S. Patent Documents, change "yamada" to ---Yamada---.
At column 16, line 9 (claim 6, line 2), change "leans" to ---lens---.
At column 18, line 24 (claim 21, line 1), change "claims" to ---claim---.
At column 19, line 10 (claim 29, line 7), change "leans" to ---lens---.

Signed and Sealed this

Seventh Day of February, 1995

BRUCE LEHMAN

*Attest:*

*Attesting Officer*          *Commissioner of Patents and Trademarks*